(12) United States Patent
Engertsberger et al.

(10) Patent No.: US 8,608,232 B2
(45) Date of Patent: Dec. 17, 2013

(54) CRASH PROTECTION ELEMENT, ITS USE AND METHOD FOR ITS MANUFACTURE

(75) Inventors: Rudolf Engertsberger, Mörschwang (AT); Roland Zöpfl, Ried im Innkreis (AT)

(73) Assignee: Benteler SGL GmbH & Co. KG, Paderborn (DE)

( * ) Notice: Subject to any disclaimer, the term of this patent is extended or adjusted under 35 U.S.C. 154(b) by 140 days.

(21) Appl. No.: 13/075,562

(22) Filed: Mar. 30, 2011

(65) Prior Publication Data

US 2012/0074735 A1  Mar. 29, 2012

(30) Foreign Application Priority Data

Mar. 31, 2010 (DE) .......... 10 2010 003 497

(51) Int. Cl.
*B60J 7/00* (2006.01)
(52) U.S. Cl.
USPC .................................................. 296/187.12
(58) Field of Classification Search
USPC ........ 296/187.12, 187.03; 297/216.1, 216.12; 180/274; 256/13.1; 293/120, 132, 133; 188/377; 280/730.2, 731, 735
See application file for complete search history.

(56) References Cited

U.S. PATENT DOCUMENTS

| | | | |
|---|---|---|---|
| 4,029,350 A * | 6/1977 | Goupy et al. ................. | 293/110 |
| 4,227,593 A * | 10/1980 | Bricmont et al. ............. | 188/377 |
| 4,948,196 A * | 8/1990 | Baba et al. ................ | 296/187.12 |
| 4,969,680 A * | 11/1990 | Shimoda ..................... | 296/146.6 |
| 5,306,068 A * | 4/1994 | Nakae et al. ............. | 296/187.12 |
| 5,419,416 A * | 5/1995 | Miyashita et al. ............ | 188/371 |
| 5,435,619 A * | 7/1995 | Nakae et al. ............. | 296/187.12 |
| 5,474,405 A * | 12/1995 | Anderson et al. ............. | 405/286 |
| 5,707,184 A * | 1/1998 | Anderson et al. ............. | 405/286 |
| 5,746,419 A * | 5/1998 | McFadden et al. ........... | 267/140 |
| 5,871,253 A * | 2/1999 | Erber ......................... | 296/146.6 |
| 5,997,077 A | 12/1999 | Siebels et al. | |
| 6,375,251 B1 * | 4/2002 | Taghaddos ............... | 296/187.03 |
| 6,830,286 B2 | 12/2004 | Bechtold et al. | |
| 6,923,499 B2 * | 8/2005 | Wieber et al. ................. | 296/211 |
| 6,959,894 B2 | 11/2005 | Hayashi | |
| 7,114,763 B2 * | 10/2006 | Riley et al. ............... | 296/187.03 |
| 7,226,120 B2 * | 6/2007 | Yamazaki ................ | 296/187.03 |
| 7,416,043 B2 * | 8/2008 | Pipkorn et al. ................ | 180/274 |
| 7,842,378 B2 * | 11/2010 | Harada et al. ............... | 428/292.1 |
| 7,866,716 B2 * | 1/2011 | Perucca et al. ................ | 293/133 |
| 8,146,863 B2 * | 4/2012 | Larcher ..................... | 244/129.5 |
| RE43,927 E * | 1/2013 | Buehler ........................... | 404/6 |

(Continued)

FOREIGN PATENT DOCUMENTS

| DE | 694 22 778 T2 | 5/1995 |
|---|---|---|
| DE | 197 36 839 A1 | 2/1999 |

(Continued)

*Primary Examiner* — Kiran B Patel
(74) *Attorney, Agent, or Firm* — Henry M. Feiereisen LLC

(57) ABSTRACT

A crash protection element, its manufacture and its use are disclosed. The crash protection element is formed by a hollow body element with or from a fiber composite. The hollow body element has in its interior one or more stabilizing and/or compression elements, which are attached on the interior sides of respective front and rear wall elements of the hollow body element in or against a suspected impact direction. The one or more stabilizing/compression elements are constructed either in form of a hollow body or in form of a multi-undulated intermediate wall element.

10 Claims, 16 Drawing Sheets

(56) References Cited

U.S. PATENT DOCUMENTS

| | | | |
|---|---|---|---|
| 8,348,032 B2 | 1/2013 | Jacob et al. | |
| 2005/0016807 A1* | 1/2005 | Braymand | 188/371 |
| 2008/0257671 A1* | 10/2008 | Jacob et al. | 188/377 |

FOREIGN PATENT DOCUMENTS

| | | |
|---|---|---|
| DE | 100 37 593 A1 | 2/2002 |
| DE | 101 59 067 A1 | 6/2003 |
| DE | 603 17 110 T2 | 12/2005 |
| DE | 102005017956 A1 | 10/2006 |
| DE | 102008015960 A1 | 10/2009 |
| EP | 0 530 042 A1 | 3/1993 |
| EP | 0 652 138 A1 | 5/1995 |
| EP | 1 607 272 A1 | 12/2005 |
| WO | WO 2005/123459 A1 | 12/2005 |

\* cited by examiner

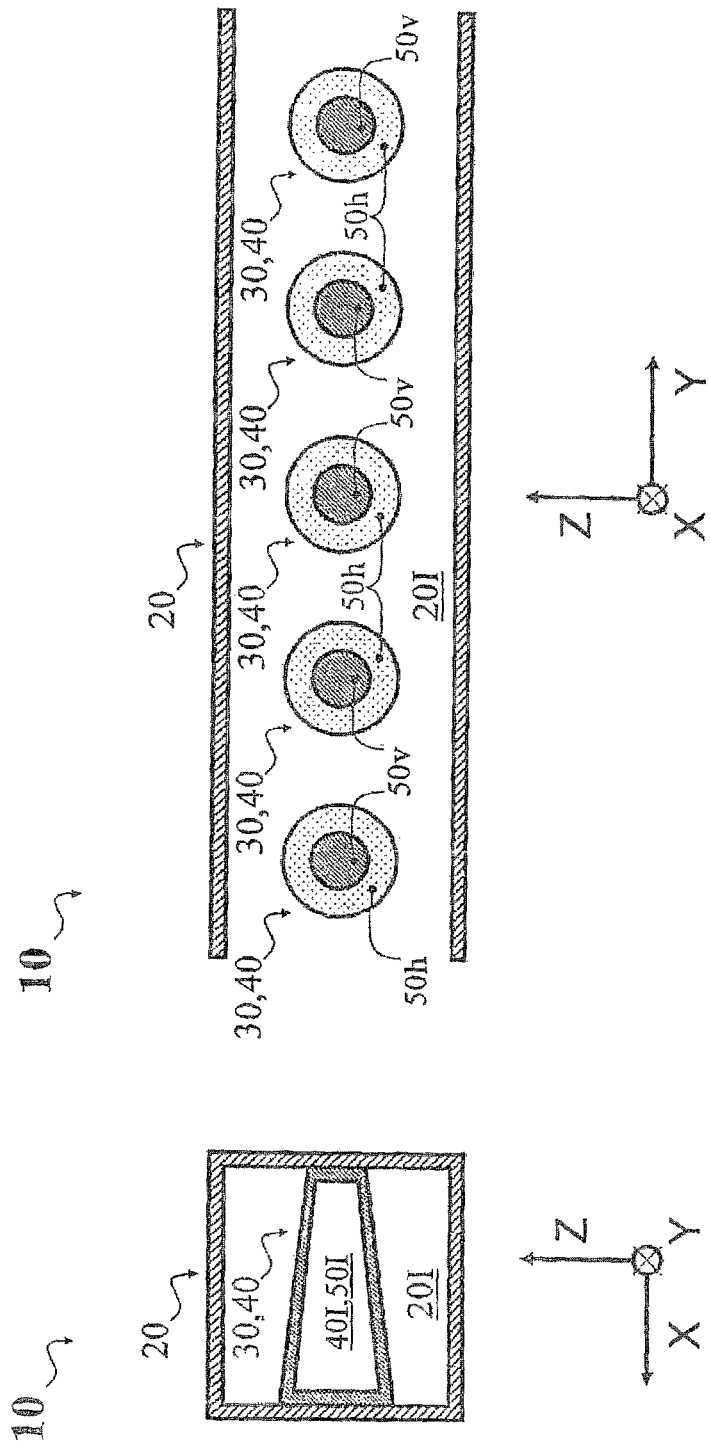

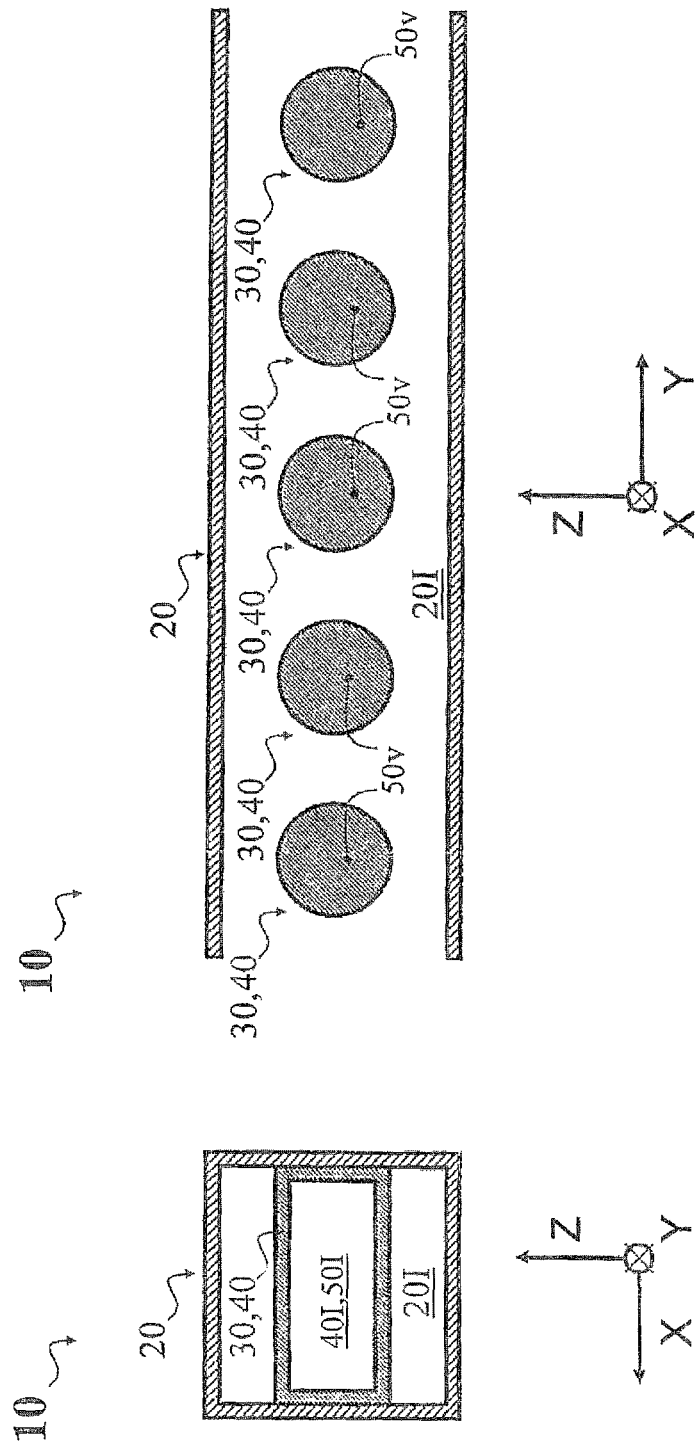

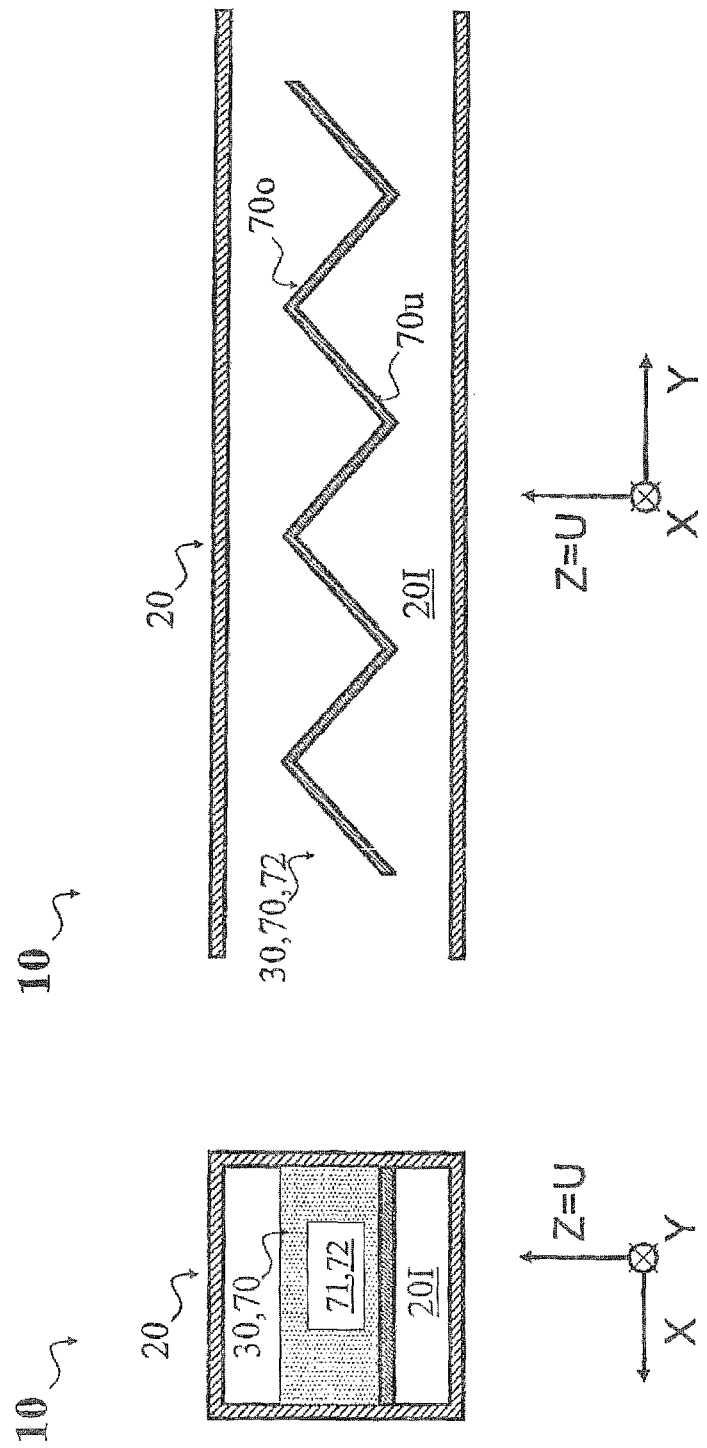

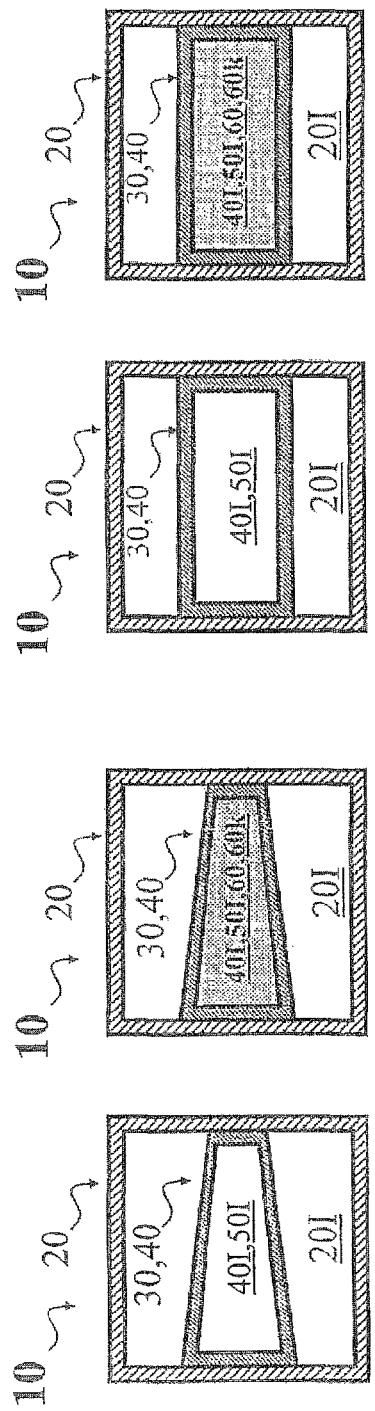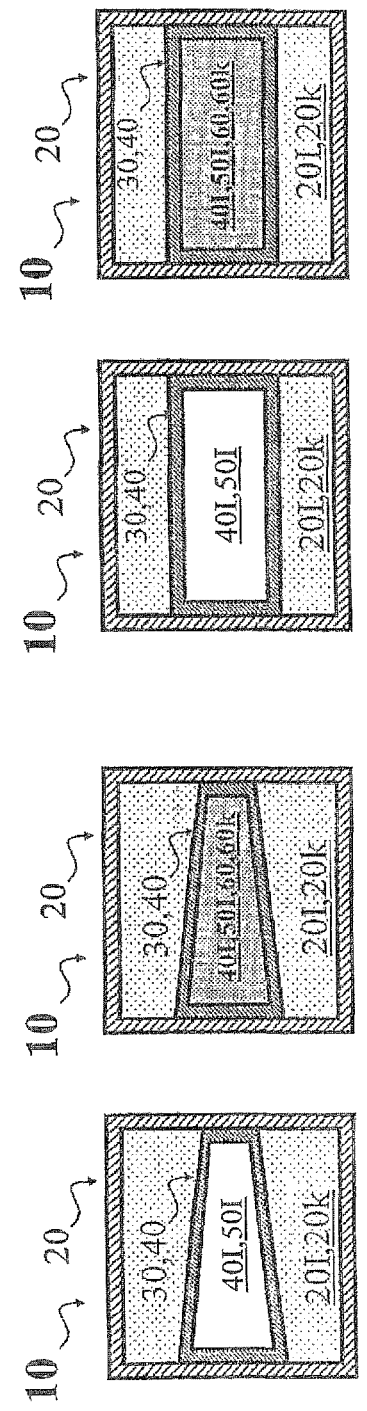

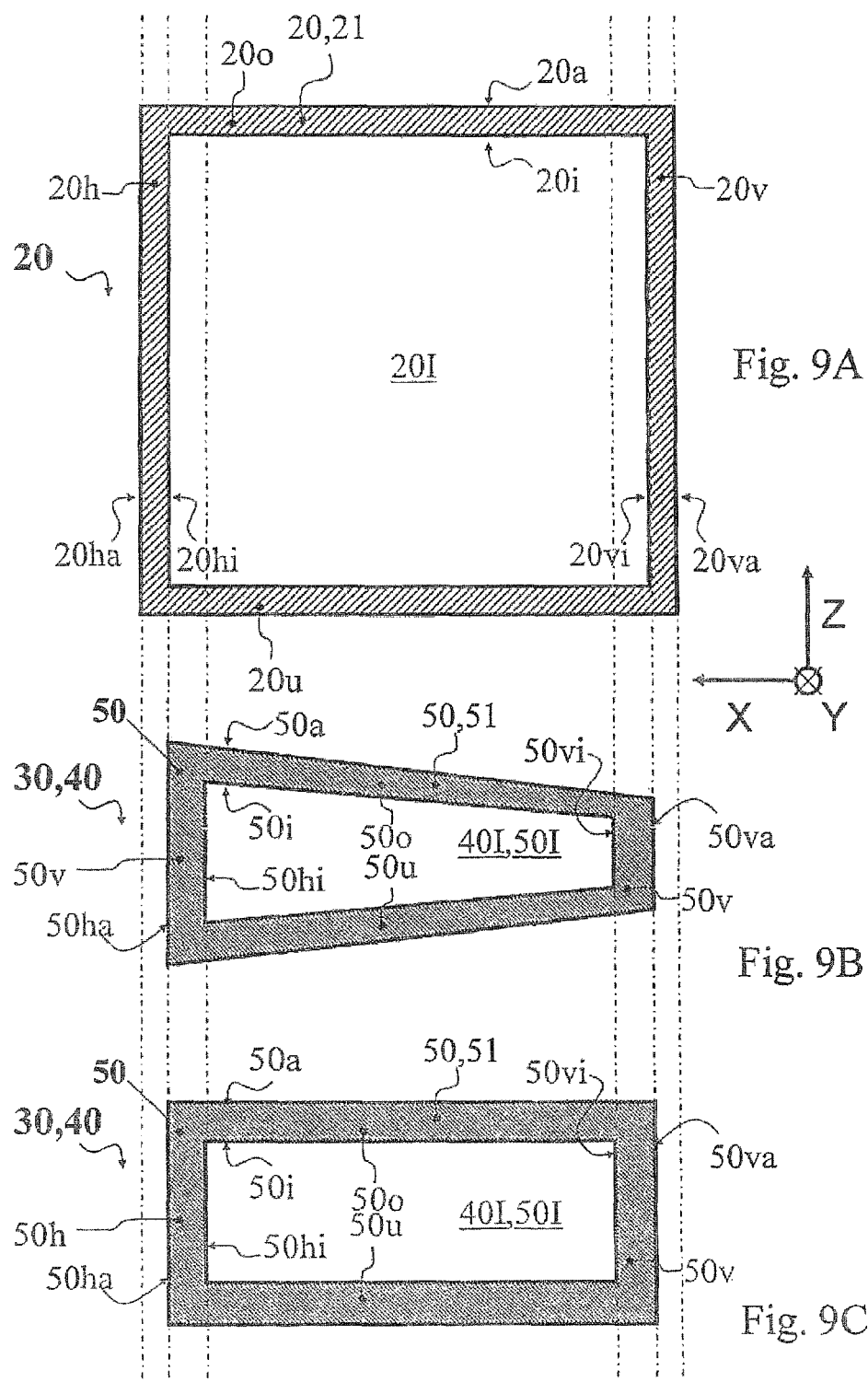

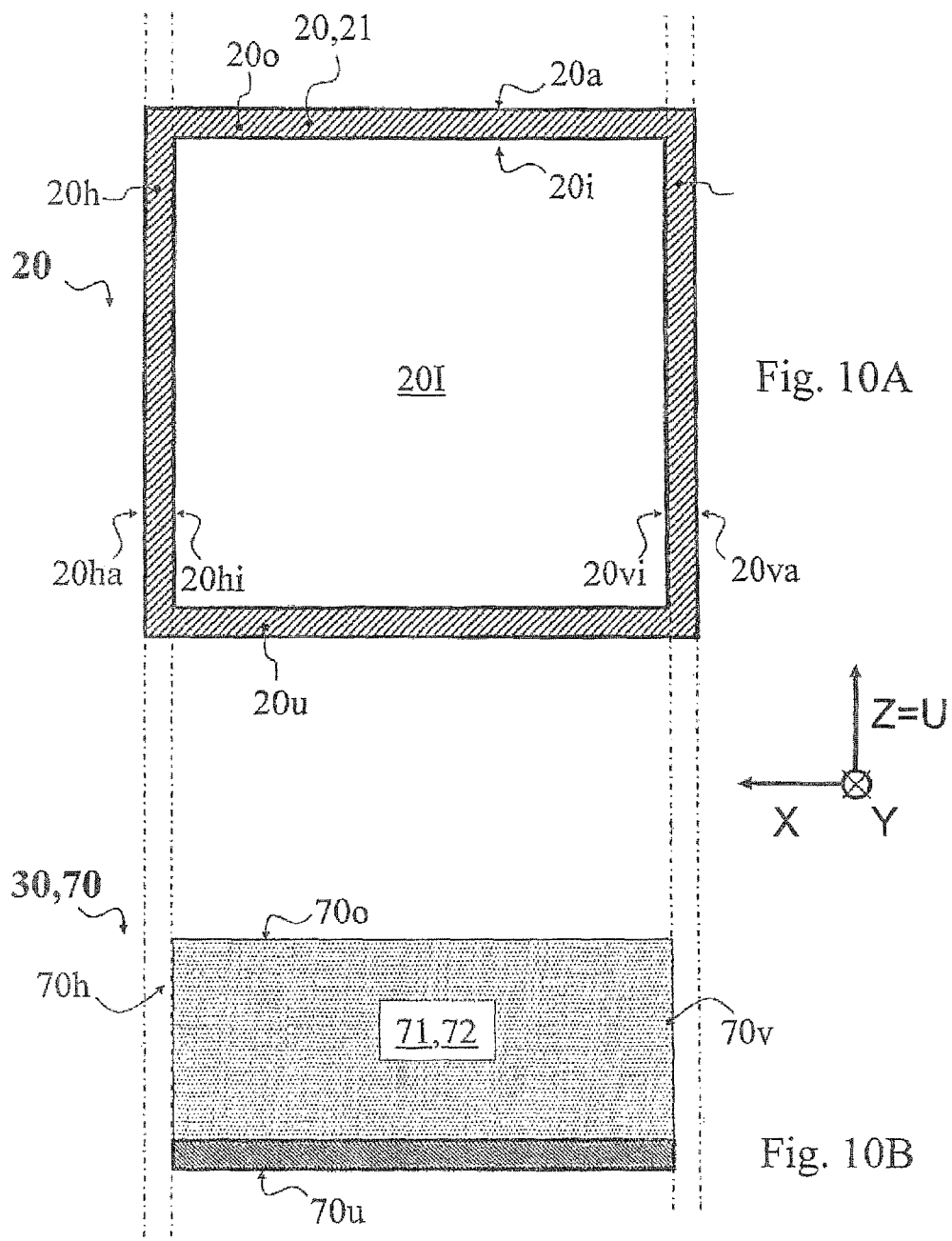

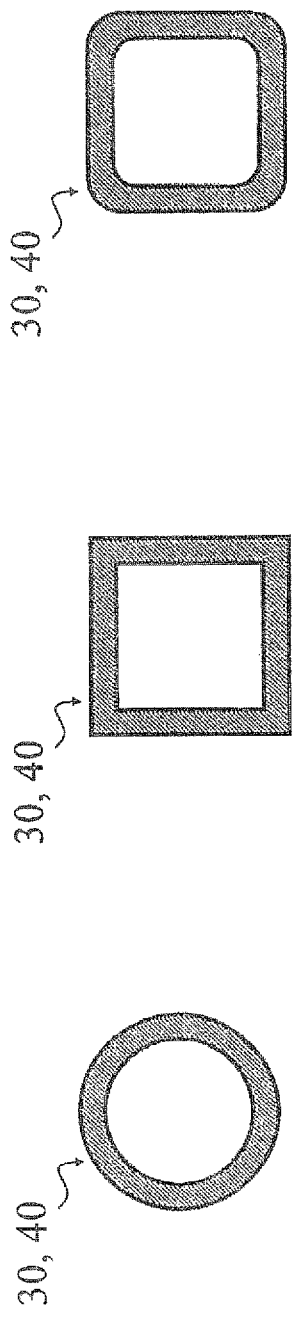
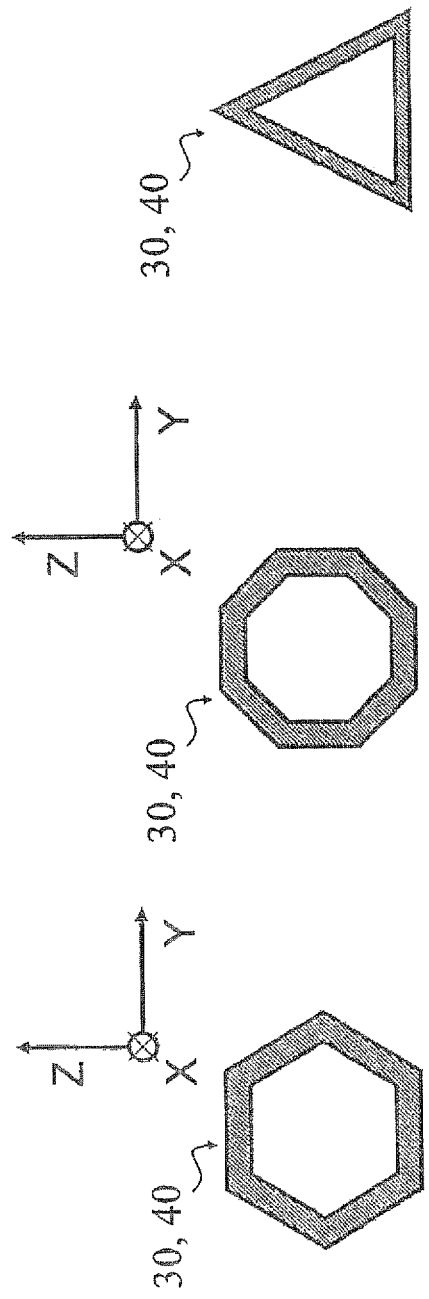

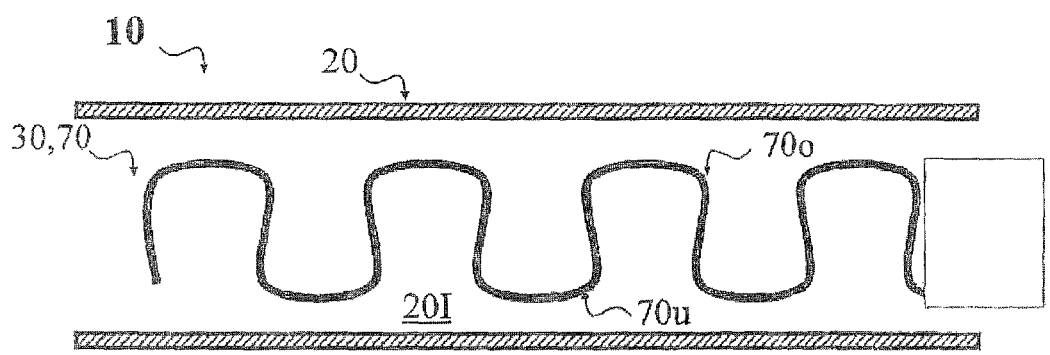
Fig. 13D
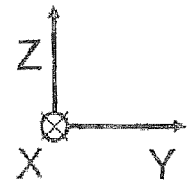
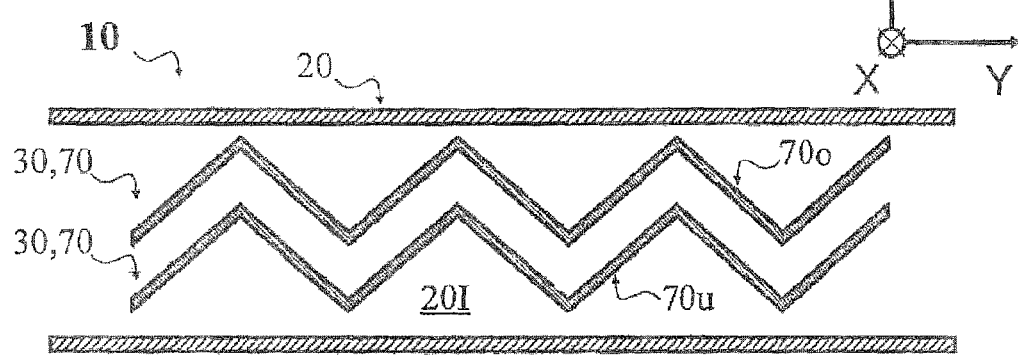
Fig. 13E
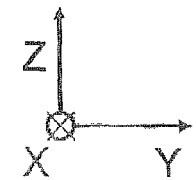
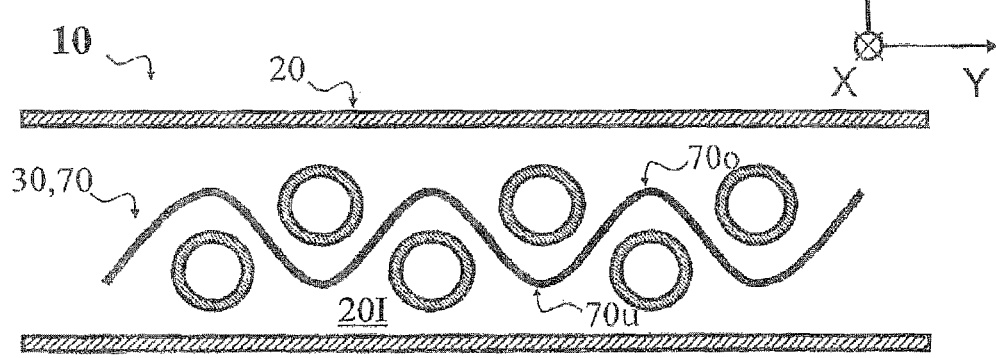
Fig. 13F
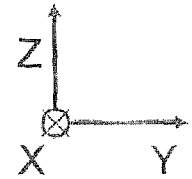

CRASH PROTECTION ELEMENT, ITS USE AND METHOD FOR ITS MANUFACTURE

CROSS-REFERENCES TO RELATED APPLICATIONS

This application claims the priority of German Patent Application, Serial No. 10 2010 003 497.5-21, filed Mar. 31, 2010, pursuant to 35 U.S.C. 119(a)-(d), the content of which is incorporated herein by reference in its entirety as if fully set forth herein.

BACKGROUND OF THE INVENTION

The present invention relates to a crash protection element, its use and a method for its manufacture. The present invention more particularly relates to so-called crash absorbers with or in hollow elements made with or from fiber composite, their manufacture and their use in the automotive industry, in particular for the production and construction of integral body-frames.

The following discussion of related art is provided to assist the reader in understanding the advantages of the invention, and is not to be construed as an admission that this related art is prior art to this invention.

In the manufacture of vehicles, in particular in the automotive industry, construction principles for the so-called integral body-frames are of utmost importance, not only with respect to the shape and the vehicle stability itself, but also with respect to the protection of the interior space of the vehicle, in particular a passenger compartment, e.g., also for extraordinary stress and for protection from external influences during an accident and the like.

Of particular importance are certain body components, e.g., the different columns, in particular the A-, B-, C- and D-columns, but also the so-called rocker panel. The rocker panel is frequently not a separate component, but is often composed of a sidewall or a side part, a reinforcement part, a reinforcement web plate and a rocker panel interior part, wherein the latter closes the overall hollow cross-section.

As already mentioned above, the rocker panel is an important component of an integral body-frame, because it not only absorbs so-called load paths during a frontal impact, but significantly enhances stability and energy dissipation tasks in conjunction with the side crash protection.

Because of these circumstances, body components made of metal and in particular the rocker panels have frequently proven to be disadvantageous, because their location and in particular their proximity to the ground and hence the effect of water in the context of contamination, such as salt and the like, frequently causes corrosion problems, which—over time—diminish the functionality of such components of integral body-frames, unless significant expenses are incurred for their protection and maintenance.

On the other hand, it is particularly important with respect to aspects of protection from a side impact to ensure, on one hand, the vehicle integrity and stability as a whole, and on the other hand, not to select an excessively high transverse stiffness due to the protection function for the passenger compartment, so that kinetic energy in a side impact can be intentionally dissipated, thereby reducing penetration velocities for such transverse movements of the chassis of parts thereof toward the interior space of the vehicle in such transverse movements.

It would therefore be desirable and advantageous to obviate prior art shortcomings by providing an improved crash protection element for a vehicle body for absorbing and dissipating kinetic energy during an impact as well as its manufacture and use, wherein a particularly reliable side impact protection for a vehicle can be realized in a particularly simple manufacturable manner and with particularly high quality and durability.

SUMMARY OF THE INVENTION

According to one aspect of the present invention, a crash protection element for a vehicle body for absorbing and/or dissipating kinetic energy during a crash, includes a hollow body element comprising a fiber composite and having a front wall element facing a suspected impact at direction and a rear wall element facing away from the suspected impact direction, the hollow body element having an interior space, and at least one stabilizing/compression element arranged in the interior space of the hollow body element and attached on interior sides of the front and rear wall elements of the hollow body. The at least one stabilizing/compression element is constructed in form of a hollow body or in form of a multi-undulated intermediate wall element, or both.

According to another aspect of the present invention, a method for producing a crash protection element includes the steps of (A) providing a core material, (B) providing at least one stabilizing/compression element, (C) embedding the at least one stabilizing/compression element in the core material, (D) partially or completely surrounding the structure obtained in step (C) with a fiber composite or a preform of a fiber composite as a jacket, (E) impregnating the structure obtained in step (D) with an impregnating material, and (F) connecting the at least one stabilizing/compression element with an interior side of the jacket.

According to another aspect of the present invention, the crash protection element according to the invention may be used in a vehicle, advantageously as part or in a part of the vehicle body, for example as rocker panel in a motor vehicle.

The present invention provides, on one hand, a crash protection element for absorbing and/or dissipating kinetic energy during an impact, which has a hollow body element made with or from a fiber composite, wherein the hollow body element has a front wall element facing a suspected impact direction X and a rear wall element facing away from the suspected impact direction X, wherein the hollow body element has in its interior one or several stabilizing/compression elements, wherein the one or more stabilizing/compression elements are attached at the interior sides of the front and/or rear wall elements facing the suspected impact direction X or facing away from the suspected impact direction X, respectively, and a) wherein one or more stabilizing/compression elements are constructed in form of a hollow body, and/or b) wherein one or more stabilizing/compression elements are constructed in form of a multi-undulated intermediate wall element.

According to another advantageous feature of the invention, a hollow body element made with or from a fiber composite may be provided, which may be, but need not be, also regarded as and/or referred to as a carbon fiber reinforced material or a carbon fiber reinforced plastic material, wherein one or several stabilizing/compression elements are provided in its interior, wherein these are attached—in particular with their end sides or end faces—on the interior sides of installed wall elements which face the suspected impact direction or face away from the suspected impact direction, respectively.

According to another advantageous feature of the invention, the one or more stabilizing/compression elements may consist of a hollow body or an intermediate wall element which is undulated, kinked or folded multiple times. The energy dissipation is therefore attained not exclusively by the hollow body shape on which the crash protection element according to the invention is based and by providing a fiber composite for the hollow body shape, but also by the interior structure formed according to the invention with one or more stabilizing/compression elements attached on the interior side and their shape as hollow body or as multi-undulated or folded intermediate wall elements.

According to another advantageous feature of the invention, the hollow body of a stabilizing/compression element may be formed with constant diameter or constant cross-section, in particular extending from a side facing away from the suspected impact direction X to a side facing the suspected impact direction X. The hollow body for the stabilizing/compression elements may therefore have a shape with a constant cross-section, e.g., a kind of cylindrical shape and the like, wherein the compression direction, i.e., the suspected impact direction extends more or less in the direction of the lateral surface area.

According to another advantageous feature of the invention, the hollow body of a stabilizing/compression element may have the shape of a cylinder—in particular with a circular and/or elliptical end or base area—cuboids and/or prisms—in particular with end faces in form of a regular or an irregular polygon, in particular in vertical or oblique form. In principle, any hollow body shape may be used which has a constant cross-section or diameter.

According to another advantageous feature of the invention, the hollow body of a stabilizing/compression element may be conical or tapered, in particular from a side facing away from the suspected impact direction X to a side facing the suspected impact direction X. On the other hand, the class of tapered over conical geometric parties may advantageously be used, i.e., bodies which have a decreasing cross-section or diameter in the direction of the suspected impact direction, i.e. from the side facing away from the suspected impact to the side facing the suspected impact.

According to another advantageous feature of the invention, the hollow body of a stabilizing/compression element may have the form of a truncated geometric body, advantageously a truncated cone—in particular with circular and/or elliptical end or base areas—or of a truncated pyramid—in particular with end faces in form of, for example, regular or irregular polygons, in particular extending from a side facing away from the suspected impact direction X to a side facing the suspected impact direction X. In general, all substantially truncated geometric bodies may be contemplated when designing the hollow bodies for the stabilizing/compression elements. The suspected impact direction and hence the compression direction extend here also substantially in the lateral surface area.

According to another advantageous feature of the invention, the hollow body of a stabilizing/compression element may be formed with or from at least one fiber composite. The fiber composite for the hollow body of the crash protection element and for the hollow body of the stabilizing/compression elements may be formed identically or differently; however, the similarity of the materials is, in any event, suitable for attaching the stabilizing/compression elements on the interior sides of the hollow body of the crash protection element.

According to another advantageous feature of the invention, the interior of the hollow body of a stabilizing/compression element may be filled with a material, in particular with a foamed material, preferably a polymer material, a metal material, a PU or polyurethane material. Filling the interior of the hollow body of the stabilizing/compression elements with a material can promote an additional reinforcement and energy dissipation. The fill could also be produced with the same thermoplastic material as the main core, and could in particular also be melted out, as with the main component.

According to another advantageous feature of the invention, an arrangement of a plurality all stabilizing/compression elements in form of hollow bodies may also be provided, in particular in form of one or several rows extending perpendicular to the suspected impact direction X and/or in a longitudinal direction Y of the hollow body element of the crash protection element. The arrangement of the plurality of stabilizing/compression elements may be commensurate in a suitable manner with the hollow body of the actual crash protection element, in particular if the hollow body extends over differently stressed sections of the associated vehicle body or if the cross-section of the hollow body itself varies.

According to another advantageous feature of the invention, a corresponding hollow body of a stabilizing/compression element in form of a hollow body may be attached, with the outside of front or rear wall elements forming end faces, to the interior sides of the front and rear wall elements of the hollow body element of the crash protection element, which face the suspected impact direction X or face away from the suspected impact direction X. The end faces of the hollow bodies of the stabilizing/compression elements form, due to their two-dimensional structure, a particularly good attachment piece for attachment on the interior sides of the hollow body of the impact protection element.

According to another advantageous feature of the invention, an undulation direction U of the undulation or the undulated segment of a stabilizing/compression element in form of a multi-undulated intermediate wall element may advantageously extend perpendicular to the suspected impact direction X and/or to a longitudinal direction Y of the hollow body element of the crash protection element. The wavy form of the intermediate wall element of the stabilizing/compression element therefore advantageously extends in the extension direction of the hollow body of the impact protection element, so that one edge or end face of the undulated intermediate wall element faces the suspected impact direction, whereas the other edge or end face of the multi-undulated intermediate wall element faces away from the suspected impact direction. The direction of the impact and hence the compression direction therefore extend essentially in the multi-undulated area of the intermediate wall element.

According to another advantageous feature of the invention, a multi-undulated intermediate wall element of the a stabilizing/compression element may have a front edge and a rear edge, which are attached on the interior sides of the front and rear wall elements, respectively, of the hollow body element which face the suspected impact direction X or face away from the suspected impact direction X. Due to their two-dimensional structure, although being less than with the hollow body-shaped stabilizing/compression elements, provides a good attachment point for securing and attachment on the interior sides of the hollow body of the crash protection element.

According to another advantageous feature of the invention, a multi-undulated intermediate wall element of the stabilizing/compression element may have a multi-undulated segment or may be formed by such a segment. A segment may have a cross-section in form of a simple or repeated saw tooth, with oblique and/or vertical flanks, in form of a simple or repeated oval or a simple or repeated rounded step, a simple or repeated wave pattern, a simple or repeated sinusoidal shape, or combinations thereof. The undulation may therefore have arbitrary shapes, wherein these different shapes may also be combined with each other. Moreover, several and—if these are identical—quasi parallel extending intermediate wall elements may be provided.

According to another advantageous feature of the invention, a multi-undulated intermediate wall element of the stabilizing/compression element may be formed with or from at least one fiber composite. With the undulated intermediate wall elements, a particularly cohesive connection of the stabilizing/compression elements on the interior sides of the hollow body of the crash protection element may be established as a result of the similarity between the fiber composite and the fiber composite of the hollow body of the crash protection element.

According to another advantageous feature of the invention, the interior of the hollow body element forming the basis for the crash protection element of the invention may be partially or completely filled with a core material, wherein the core material embeds in particular one or more stabilizing/compression elements. A filling can simplify the manufacturing process considerably, because production processes exist where the filling as core material is supplied first, whereafter the one or several stabilizing/compression elements are inserted into the filling, and whereafter the attained structure is encased with the corresponding fiber composite. Release of the core material may then be eliminated with proper selection of the filling material and if filled hollow elements are preferred as crash protection elements.

According to another advantageous feature of the invention, a corresponding fiber composite may include or be formed from one or more materials selected from the group consisting of CFK materials, glass materials, aramide materials, natural fiber materials, basalt materials, and their combinations.

According to another advantageous feature of the invention, connecting the stabilizing/compression elements with the interior side of the jacket may be performed either simultaneously with the process (E) of impregnation—e.g., with an RIM process with applied pressure and/or temperature—or in a separate and subsequent step of the post-processing of the structure obtained in step (E), e.g., with the VAP process.

It is important for the simultaneous connection of the stabilizing/compression elements with the interior side of the jacket in step E that both the main layers on the outside of the main component core as well as the fiber layers of the stabilizing/compression elements as crash elements are also wetted during the impregnation with the resin or the like—in the same process and at the same time—and subsequently hardened together. Because the fibers of the stabilizing/compression elements as crash elements are in contact with the main layers, the resin or the like form a fiber butt joint capable of transmitting the introduced forces from the outside structure to the crash elements.

A post-processing step may include a potentially required release of cores.

In the manufacturing method according to the invention, the core material and the one or more stabilizing/compression elements embedded in the core material are provided and the obtained embedded structure is subsequently partially or completely encased, so that either a connection is automatically produced between the interior side of the formed hollow body of the crash protection element and the stabilizing/compression elements arranged in the interior, either simultaneously during impregnation or in a subsequent post-processing step. This eliminates subsequent insertion and attachment of the stabilizing/compression elements in a provided hollow body form.

According to another advantageous feature of the invention, embedding the stabilizing/compression elements in the core material may be performed by creating in the provided core material one or more hollow spaces matching the stabilizing/compression elements and thereafter inserting or introducing the stabilizing/compression elements in the hollow spaces. The core material is therefore supplied and provided with one or more hollow spaces which correspond to the contour of the one or more stabilizing/compression elements, in which thereafter the one or more stabilizing-compression elements are introduced, in order to thereafter be encased with the fiber composite for the hollow body of the crash protection element.

According to another advantageous feature of the invention, embedding of the stabilizing/compression elements in the core material may alternatively also be performed by supplying the one or more stabilizing/compression elements and thereafter encasing them with the provided core material. This approach is sometimes simpler, because the one or more stabilizing/compression elements to be provided are supplied in order to be then first embedded in the core material, before being encased with the fiber composite for the hollow body of the crash protection element.

According to another advantageous feature of the invention, partial or complete encasing with the fiber composite or a preform of a fiber composite may be performed by enveloping, braiding, wrapping and/or overlaying the embedded structure of core material and one or more stabilizing/compression elements with the fiber composite or its preform. Processing methods could also be envisioned which enable surrounding the previously produced structure with the stabilizing/compression elements embedded in the core material.

According to another advantageous feature of the invention, impregnating the encased structure may be performed by applying or introducing the impregnating material, in particular a polymer matrix material, preferably resin or a phenol resin, in particular in conjunction with an infusion process and/or an RTM process, e.g., a vacuum infusion, and/or in conjunction with a corresponding impregnating tool or an impregnating mold, preferably in a closed configuration.

According to another advantageous feature of the invention, the impregnated and encased structure may be hardened during post-processing, in particular by applying temperature and/or pressure.

Alternatively or in addition, during post-processing, the core material contained in the impregnated encased structure may be removed, in particular by applying a temperature step through melting or through chemical isolation, so that at least part of the interior of the hollow element of the crash protection element is left with one or more hollow spaces.

According to another advantageous feature of the invention, the crash absorber, i.e., the stabilizing/compression elements may be connected to the main component as follows:
A: With cones, fiber layers are folded inwardly and envelop the component at the end faces. This is possible with hollow body shapes.
B: Fiber layers are folded outwardly and form a kind of wings which rest against the main fiber layers. To this end, the main component core must have corresponding openings. This is possible with hollow body shapes and with intermediate wall elements.
C: A combination of A and B, one part is folded inwardly, one part is folded outwardly. This is possible with hollow body shapes.

According to another advantageous feature of the invention, in the hollow body form of a stabilizing/compression element, the support core may remain in the hollow component if the core is, for example, made of foamed materials. If the core is made of the same releasable material as the main component core, then the core may also be removed.

BRIEF DESCRIPTION OF THE DRAWING

Other features and advantages of the present invention will be more readily apparent upon reading the following description of currently preferred exemplified embodiments of the invention with reference to the accompanying drawing, in which:

FIGS. 4A-6B show a schematic cross-sectional side view and a schematic cross-sectional view of various crash protection elements according to the present invention analogous to the embodiments of FIGS. 1 to 3;

FIGS. 7A-8D show schematic cross-sectional side views of embodiments of a crash protection element according to the present invention based on hollow bodies for the stabilizing/compression elements, wherein the respective hollow spaces are configured with different fill levels;

FIGS. 9A-C show schematic cross-sectional side views of different details of embodiments of a crash protection element according to the present invention analogous to the examples of FIGS. 1 and 2;

FIGS. 10A, B show schematic cross-sectional side views of details of a crash protection element analogous to the example of FIG. 3;

FIGS. 12A-F show schematic cross-sectional top views of different cross-sectional shapes of stabilizing/compression elements based on hollow bodies, which can be used with the crash protection element according to the present invention;

FIGS. 13A-F show schematic cross-sectional top views of different arrangements for crash protection elements according to the present invention, wherein different stabilizing/compression elements constructed as multi-undulated intermediate wall elements are provided individually or in combination with each other, or in combination with stabilizing/compression elements in from of hollow bodies;

DETAILED DESCRIPTION OF PREFERRED EMBODIMENTS

Figure 1:
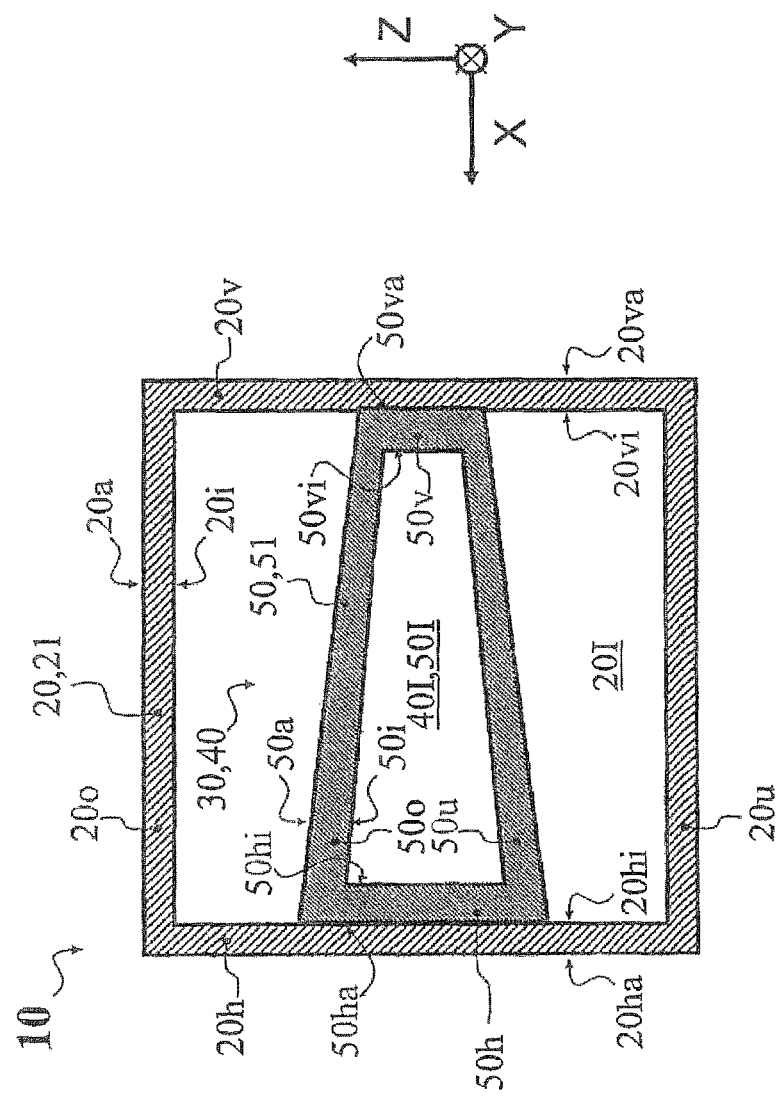
FIGS. 1, 2 show schematic cross-sectional side views of two embodiments of a crash protection element according to the present invention, wherein the stabilizing/compression elements are constructed in the shape of hollow bodies.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Before turning to particular figures of the drawing, reference will be made to the drawing in general.

An improved crash protection, for example by reinforcing a hollow component made from one or several fiber composite materials, configured as a structural element, preferably for a vehicle body, is constructed in hollow construction and is designed, in particular, with a releasable or dissolvable core, requiring essentially only a single process step for its manufacture.

The manufacture of the component as a crash protection element according to the invention in a single process step with one or several reinforcement elements inserted in a releasable core has also operational advantages, resulting in time and material savings, and in addition results in particularly stable structures which dissipate the kinetic energy in a crash particularly well.

The elements provided in the hollow component can be constructed in different forms, e.g., in form a hollow body made of CFK material and filled with polyurethane material, advantageously in the shape of a cone, or in the shape of a multi-undulated intermediate wall element, advantageously with a sinusoidal shape.

The crash protection element according to the invention can be used in the technical field of integral body-frames, preferably in vehicles and particularly in motor vehicles, e.g., passenger cars. In particular, the so-called rocker panel can hereby be constructed as a hollow element.

According to the invention, the manufacture can take place in a single step, e.g., by way of shaped fiber preforms in the context of an infusion method—e.g., RTM for impregnating and hardening.

In particular for a side impact or side crash, particularly suitable impact elements or crash elements can be manufactured as composite with cores, e.g., from polyurethane material. The crash elements to be provided in the hollow body, which are often referred to in the context of the invention as a stabilizing/compression elements, can be constructed tapered, in particular conical, with a base having an arbitrary shape, e.g., round, oval, polygonal and the like.

Alternatively or in addition, crash elements are stabilizing/compression elements in form of curved intermediate walls are also feasible, which have, for example, a wavelike shape, a square shape, but have always one or several undulations. The shape of the organization direction is hereby perpendicular to the impact or crash direction, so that an end face or edge of the multi-undulated intermediate wall or the curved wall is constructed to face or faces away from the suspected impact direction.

Depending on the application, undulated shapes, for example, also sinusoidal shapes can be particularly preferred for the intermediate element. The sinusoidal shape is here introduced into the releasable core before the component is manufactured. After infusion of the component for treatment with an impregnating material, e.g., for resin treatment, the core can be melted out. Thereafter, the multi-undulated intermediate wall, e.g., with a sinusoidal shape, in the actual hollow component for the crash protection element according to the invention is exposed and connected only at its edges or end sides with the interior side of the hollow component as the major component.

The infusion and consequently the manufacture of the hollow body for the crash protection element hence take place in a single process step, wherein the component itself and the reinforcement are commonly infused in this production process. In other words, after encasing the hollow body-shaped stabilizing/compression elements with the material forming the hollow body, a common treatment with an impregnating material, e.g., a resin or phenol resin takes place, so that in addition to the actual jacket for the hollow body of the crash protection element the interior stabilizing/compression elements can also be impregnated with the impregnating material, e.g., the resin or phenol resin, and subsequently hardened.

When implemented in conical form, one or several stabilizing/compression elements in conical form can be introduced into a provided releasable core during the manufacturing process before the component is produced. The same applies, of course, also to substantially cylindrical stabilizing/compression elements. In this case, the obtained structure is, after introduction into the releasable core, surrounded with the fiber composite, e.g., CFK material for the hollow body of the crash protection element, impregnated and hardened.

For producing the cylindrical or conical hollow body-shaped stabilizing/-compression elements, a correspondingly shaped core is provided which can be formed from a releasable material or from a material remaining in the component (e.g., a foam material). Accordingly, an enveloping material is applied around the provided core, for example a fiber material, preferably a CFK material.

After the aforedescribed introduction into the core material for the hollow body of the crash protection element, infusion is performed. After the infusion, meaning treatment with the impregnating material, preferably with a resin or phenol resin, the core or the core material for the hollow body of the crash protection element and also the core of the hollow body-shaped stabilizing/compression elements, depending on their type, can be removed by melting out. The actual stabilizing/compression elements then are in free contact inside the core component for the crash protection element according to the invention, being connected with the main component in form of the hollow body for the crash protection element according to the invention only at the end sides, i.e., at the end faces of the respective hollow body-shaped stabilizing/compression element.

Infusion and consequently manufacture of the hollow body for the crash protection element is here also performed in a single process step, wherein the hollow body or the hollow component for the crash protection element according to the invention and the reinforcement for the hollow body-shaped stabilizing/compression elements in this production process are commonly infused, i.e., treated with the impregnating material, preferably the resin or phenol resin, and hardened.

In this approach, essentially the core for the hollow body of the crash protection element is initially formed. Thereafter, the openings required for the stabilizing/compression elements are provided. The openings are then equipped with the stabilizing/compression elements. The obtained structure is enveloped with the fiber material, e.g., braided, wrapped or covered.

After the application of the fibers, the component is inserted, e.g., in a mold tool and then infused with the impregnating material, e.g., the resin or phenol resin, the crash protection element is manufactured in this way, e.g., in form of a CFK body or a CFK structure with a hollow form and with the corresponding one or more stabilizing/compression elements arranged in its interior.

This approach has the advantage that the stabilizing/compression elements are treated with the impregnating material in the same way as the outer jacket, wherein a compact component is produced as a result of the overlap at the contact locations between the edges or end faces of the stabilizing/compression elements and/or the hollow body, i.e., a connection between the interior side or interior wall of the hollow body of the crash protection element according to the invention and the one or several stabilizing/compression elements formed in the interior. Accordingly, the complexity associated with the introduction of the stabilizing/compression elements into a prefabricated hollow body at a later time is eliminated, because those can already be manufactured in conjunction with the infusion or impregnating process of the main component and attached to the interior side.

The process of releasing the core material of the hollow body of the crash protection element is to be understood in very general terms. In one embodiment, the core material which initially surrounds the stabilizing/compression elements can be melted out, in particular when a thermoplastic material is used. It would also be feasible, for example, to collect and reuse the melted material. In addition to melting out, other possibilities of removing or releasing the core material can be envisioned, for example chemically.

Impregnating in the corresponding mold tool can be performed, for example, with an RIM process (resin transfer molding), wherein the wrapped structure introduced into the tool is treated with the impregnating material inside the mold by introducing the impregnating material, e.g., from an antechamber via pistons through channels arranged in the mold of the mold tool, and thereafter hardened by applying pressure and/or heat.

In this context, a general infusion process under pressure can be used, wherein introduction of the impregnating material is supported by a vacuum in the tool.

Different sub-processes of the RTM process are also feasible, namely with and without vacuum, RTM-light, differential pressure RIM and so on.

Turning now to the drawing in detail, and in particular to FIG. 1, there is shown a in a schematic cross-sectional side view a first embodiment of the crash protection element 10 according to the invention. This element is constructed as a hollow body element 20 made from a CFK material 21, in particular from a carbon fiber-reinforced plastic material, and has in relation to the suspected impact direction X a front wall or a front wall element 20$v$ and a rear wall of a rear wall element 20$h$ as well as upper and lower walls or wall elements 20$o$ and 20$u$, respectively. These walls or wall elements 20$v$, 20$h$, 20$o$, 20$u$ enclose, on one hand, the interior 20$l$ of the hollow body 20 or hollow body elements 20 forming the basis for the crash protection element 10 according to the invention and hence form its interior side 20$i$ or interior surface 20$i$. However, they also form the exterior side 20$a$ or exterior surface 20$a$ of the hollow body 20 or hollow body elements 20 forming the basis for the crash protection element 10 according to the invention, wherein the exterior side 20$va$ or exterior surface 20$va$ of the front wall element 20$v$ faces the suspected impact direction X, whereas the exterior side 20$ha$ or exterior surface 20$ha$ of the rear wall element 20$h$ faces away from the suspected impact direction X.

This fundamental structure is essentially identical for all embodiments of the crash protection element 10 according to the invention and is not always repeated when it appears in the various exemplary embodiments of the crash protection element 10 according to the present invention.

In the embodiment of the crash protection element 10 according to the invention illustrated in FIG. 1, a single stabilizing/compression element 30 is shown in the interior 20l of the hollow body 20 or hollow body element 20; however, several stabilizing/compression elements 30 can be provided which are each arranged perpendicular to the cross-sectional direction before and/or behind the illustrated stabilizing/compression element 30.

In the embodiment of the present invention illustrated in FIG. 1, the stabilizing/compression element 30 provided in the interior 20l of the hollow body 20 or hollow body element 20 is constructed in form of a hollow body 40, namely with a jacket 50, with an exterior side 50a and an interior side 50i, which surround the interior 40l, 50l, and optionally—see the embodiments according to FIGS. 7B, 7D, 8B, 8D—have a core region 60 or a core element 60 with a corresponding fill or core material 60k.

The jacket 50 itself is formed by an upper wall 50o, a lower wall 50u, and a front wall 50v facing the suspected impact direction X and a rear wall 50h facing away from the suspected impact direction X with corresponding associated exterior sides 50oa, 50ua, 50va, 50ha and interior sides 50oi, 50ui, 50vi, 50hi.

The jacket 50 of the hollow body 40 other stabilizing/compression element 30 can again be made from a CFK material 51, which can be different from the CFK material 21 of the hollow body element 20 forming the basis for the crash protection element 10 according to the invention, but can also be identical.

According to another important aspect of the present invention, the interior sides 20vi and 20hi of the front end of the walls or wall elements 20v, 20h of the hollow body element 20 forming the basis for the crash protection element 10 according to the invention are connected with the exterior sides 50va and 50ha of the corresponding front and rear walls or wall elements 50v or 50h, respectively, or the stabilizing/compression element(s) 30 arranged in the interior I of the hollow body element 20.

In the embodiment of FIG. 1, the stabilizing/compression element 30 with the hollow body form 40 has a tapered shape, in particular a conical shape, wherein the hollow body form 40 is tapered down from the side facing away from the suspected impact direction X to the side facing the suspected impact direction X. This means for the embodiment of FIG. 1 that the rear wall 50h of the jacket 50 has a greater base surface area than the front wall 50v.

Other structures can generally be contemplated when the hollow body form 40 of the stabilizing/compression element(s) 30 has a constant or substantially constant cross-section along the suspected impact direction X.

Figure 2:
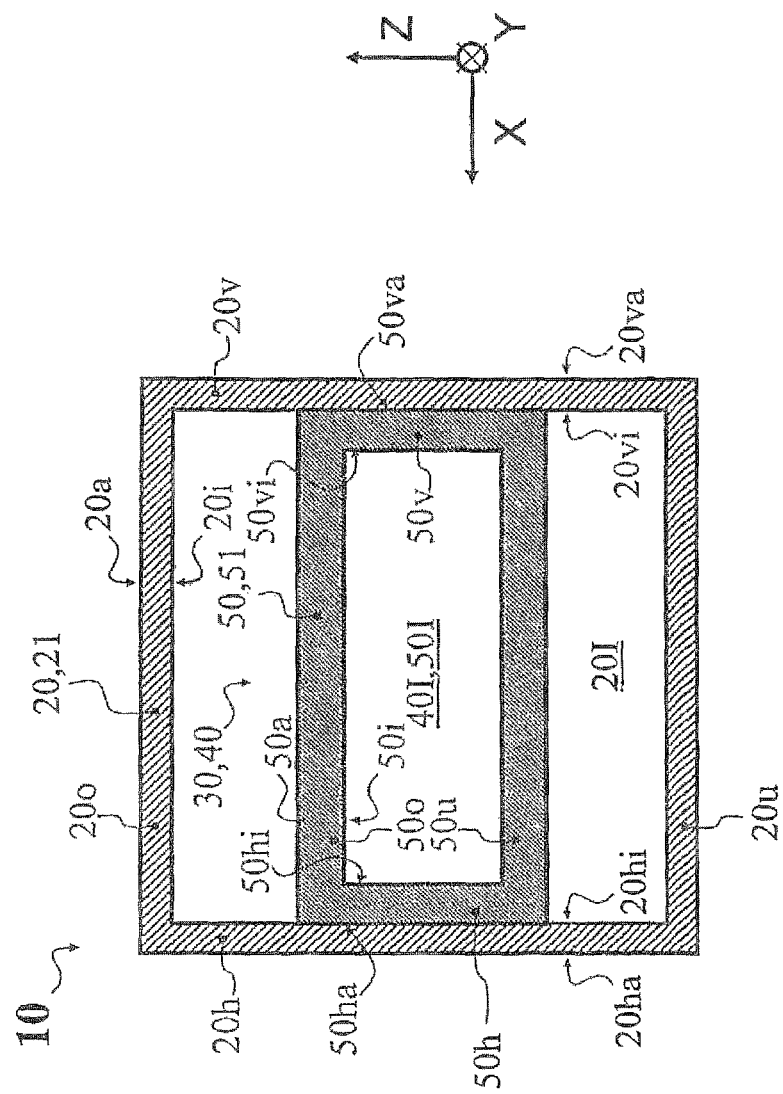

This is illustrated in the embodiment of FIG. 2, which has otherwise an analogous structure to the embodiment of FIG. 1. The hollow body 40 of the illustrated stabilizing/compression element 30 has a substantially constant cross-section along the suspected impact direction X, i.e. in the direction Z along the vertical or extension direction Y of the hollow body element 20 forming the basis for the crash protection element 10 according to the invention. This means in particular that the front and rear walls 50v and 50h of the jacket 50 of the hollow body form 40 have identical surfaces and are, in particular, conformal or congruent with each other.

The base shapes of the jackets 50 of the hollow bodies 40 of the corresponding stabilizing/compression elements 30 of the embodiments from FIGS. 1 and 2 are hereby assumed to be, for example, circular, so that the hollow body forms 40 in FIGS. 1 and 2 are shaped as a vertical truncated cone or as a vertical cylinder.

Also feasible are oblique structures, wherein the end faces and hence also the front and rear walls 50v and/or 50h are formed with laterally offset centers.

On the other hand, other shapes of base areas, meaning base areas which differ from a circular shape, are feasible, as shown in FIGS. 12A to 12F. For example, elliptical base areas can be provided, but also base areas delimited by polygons, as illustrated as a square in FIG. 12B, a regular hexagon in FIG. 12D, a regular octagon in FIG. 12E, and a isosceles triangle in FIG. 12F. General rectangular shapes, rhombohedra, trapezoids, kite-shapes, etc., are also feasible. The corners or edges can be rounded, as shown in conjunction with FIG. 12C and the basic square shape.

Figure 3:
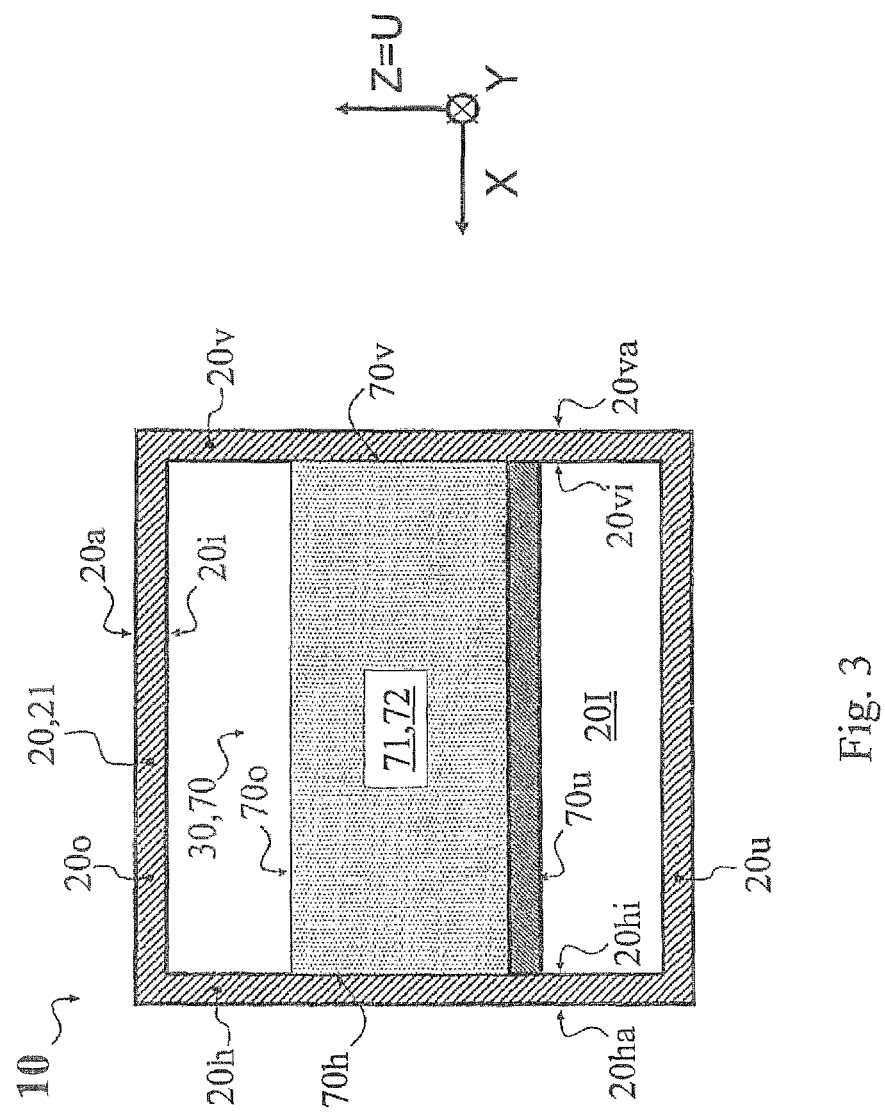
FIG. 3 shows a schematic cross-sectional side view of another embodiment of a crash protection element according to the present invention, wherein the stabilizing/compression elements is constructed as a multi-undulated intermediate wall element.

FIG. 3 shows a different embodiment of the crash protection element 10 according to the invention, wherein instead of the hollow body form 40 for the stabilizing/compression elements 30, a structure is provided which has the structure of a multi-undulated, folded, bent or wavelike intermediate wall element 70.

In general, this is referred to as undulation. This includes all structural measures relating to a deviation from a planar intermediate wall element. In FIG. 3, the undulation direction U is identical with the vertical direction Z, i.e., the undulation itself, meaning the wave shape, the bends, folds, etc., extend starting from a planar structure in the Z direction and therefore perpendicular to the suspected impact direction X and also perpendicular to the longitudinal extension direction Y of the hollow body element 20 forming the basis for the crash protection element 10.

In FIG. 3, which also shows a schematic cross-sectional side view of this embodiment of the crash protection element 10 according to the invention, the structure of the invention is viewed, like in FIGS. 1 and 2, also in the longitudinal extension direction Y.

The multi-undulated intermediate wall element 70 is advantageously made from a CFK material 71 and has in addition to the top side or top area 70o and the bottom side or bottom area 70u corresponding edge regions or edge faces 70v, 70h, wherein in particular the front edge side 70v or edge surface 70v facing the suspected impact direction X and the rear edge side 70h or edge surface 70h facing away from the suspected impact direction X are important, because these are attached to the interior sites or interior surfaces 20vi and 20hi of the front and/or rear wall elements or walls 20v and 20h, respectively, which face and/or face away from the suspected impact direction X, respectively.

FIGS. 4A to 6B show structures for crash protection elements 10 according to the invention which have certain commonalities with the structures of FIGS. 1 to 3. The Figures labeled with "A" show once more a schematic cross-sectional side view in the direction Y, whereas the Figures labeled with "B" show schematic cross-sectional top views, namely in the suspected impact direction X.

In FIG. 4B, one looks onto the area of the front wall element 50v of the jacket 50 of the hollow body forms 40 of the, in this case, several stabilizing/compression elements 30. Also schematically indicated is the rear wall 50h of the jackets 50.

Analogous is the arrangement of FIGS. 5A and 5B with a cylindrical shape of the hollow bodies 40 of the, in this case, several stabilizing/compression elements 30.

FIGS. 6A and 6B shows an embodiment with a multi-undulated intermediate wall 70 which in this case forms a single stabilizing/compression element 30, wherein the arrangement is again viewed in the suspected impact direction X, so that one looks in the drawing on the front edge 70v or on the front edge region 70v.

FIGS. 7A to 7D show schematically cross-sectional side views of different embodiments of the crash protection element 10 according to the invention, with one or several conical stabilizing/compression elements 30 with a hollow body form 40.

The illustrated embodiments of FIGS. 7A to 7D are different only with respect to their fill state of the respective hollow spaces or interior regions 20*l* of the hollow body element 20 and 40*l*, 50*l* of the hollow body form 40 forming the basis for the crash protection element 10 according to the invention and the jacket 50 of the corresponding stabilizing/compression elements 30.

In the embodiment of FIG. 7A, all hollow spaces are empty, i.e., are not filled.

Conversely, in the embodiments of FIGS. 7B and 7D the interior regions 40*l*, 50*l* of the stabilizing/compression elements 30 are filled with a core material 60*k* as core region 60 or core element 60. During manufacture, this core region 60 or the core element 60 made from the core material 60*k* can be supplied and thereafter surrounded with the corresponding jacket 50 for the hollow body form 40.

In the embodiment of FIG. 7B, the stabilizing/compression element 30 is filled, whereas the interior 20*l* of the hollow body element 20 is unfilled, i.e. empty.

Conversely, in the embodiments of FIGS. 7C and 7D, the interior 20*l* of the hollow body element 20 is filled with a core material 20*k*.

In FIG. 7D, the interior 40*l*, 50*l* of the hollow body form 40 and of the jacket 50 of the stabilizing/compression elements 30 is also filled with the core material 60*k* forming the core region 60, whereas in FIG. 7C the stabilizing/compression element 30 is unfilled.

FIGS. 8A and 8D other show schematically in a cross-sectional side view embodiments of the crash protection element 10 according to the invention with stabilizing/compression elements 30 in hollow body form 40, however, unlike the embodiments of FIGS. 7A to 7D, with a constant cross-section, e.g., cylindrical, in the suspected impact direction X. Otherwise, the structures are analogous to those of FIGS. 7A to 7D.

FIGS. 9A to 9C show in a schematic cross-sectional side view as an exploded representation an embodiment of the crash protection element 10 according to the invention, wherein FIG. 9A substantially shows the hollow body element 20 forming the basis for the crash protection element 10 according to the invention, whereas FIGS. 9B and 9C show a respective conical and a cylindrical stabilizing/compression element 30 in form of a hollow body.

In an analogous fashion, FIGS. 10A and 10B show in a schematic cross-sectional side view as an exploded representation an embodiment of the crash protection element 10 according to the invention, wherein FIG. 10A again illustrates the hollow body element 20 forming the basis for the crash protection element 10 according to the invention, and FIG. 10B a corresponding stabilizing/compression element 30 with a multi-undulated intermediate wall 70.

Figure 11A:
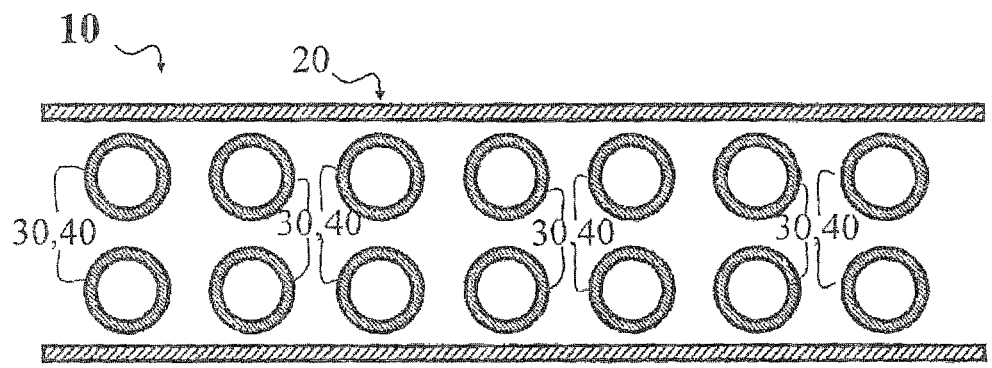
FIGS. 11A-C show schematic cross-sectional top views of different embodiments of a crash protection element according to the present invention with different arrangements when several stabilizing/compression elements in form of hollow bodies are present.
Figure 11B:
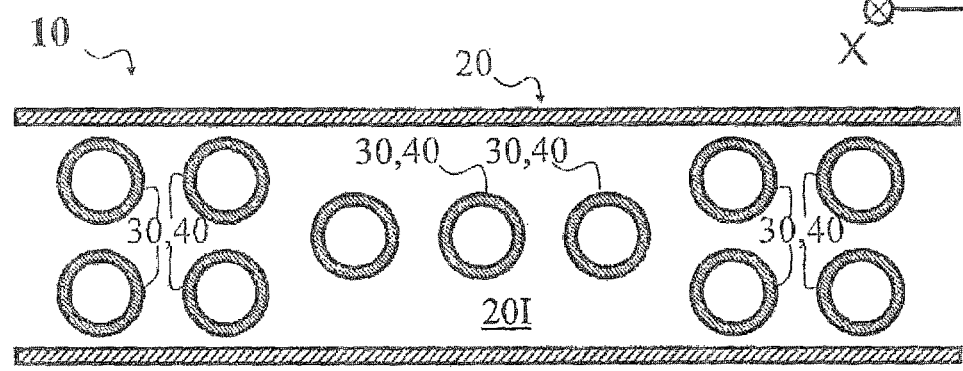
Figure 11C:
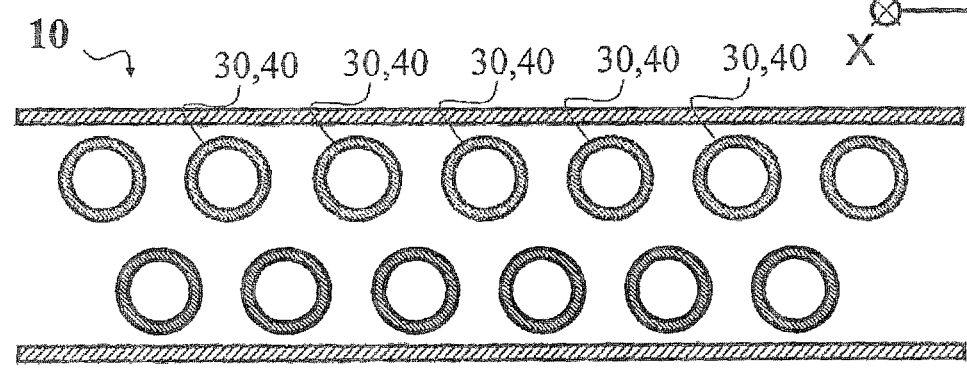
Figure 13A:
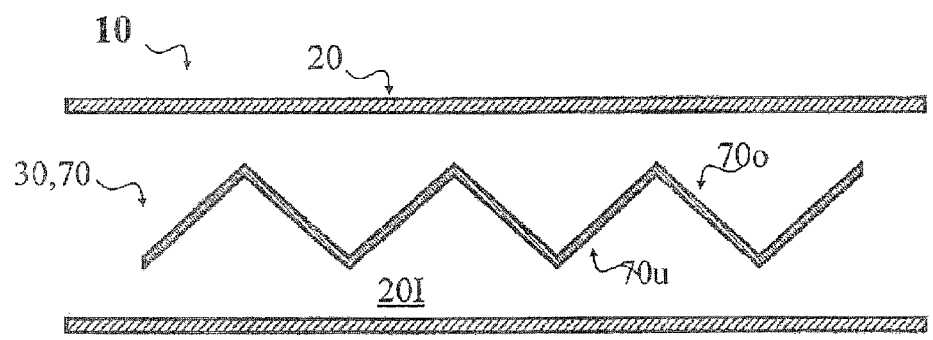
Figure 13B:
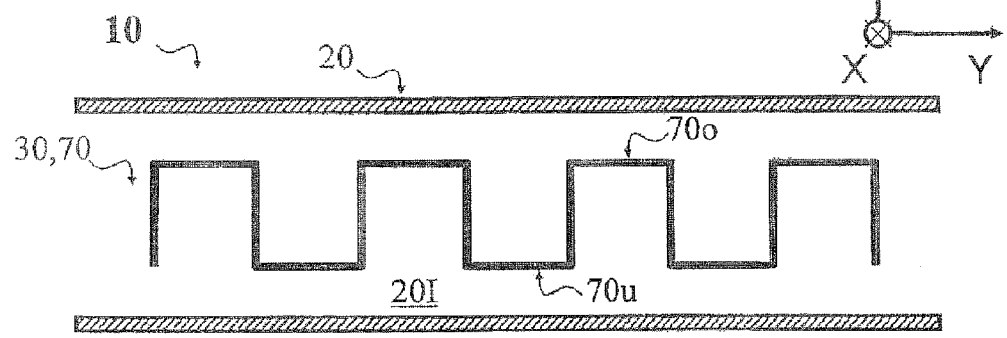
Figure 13C:
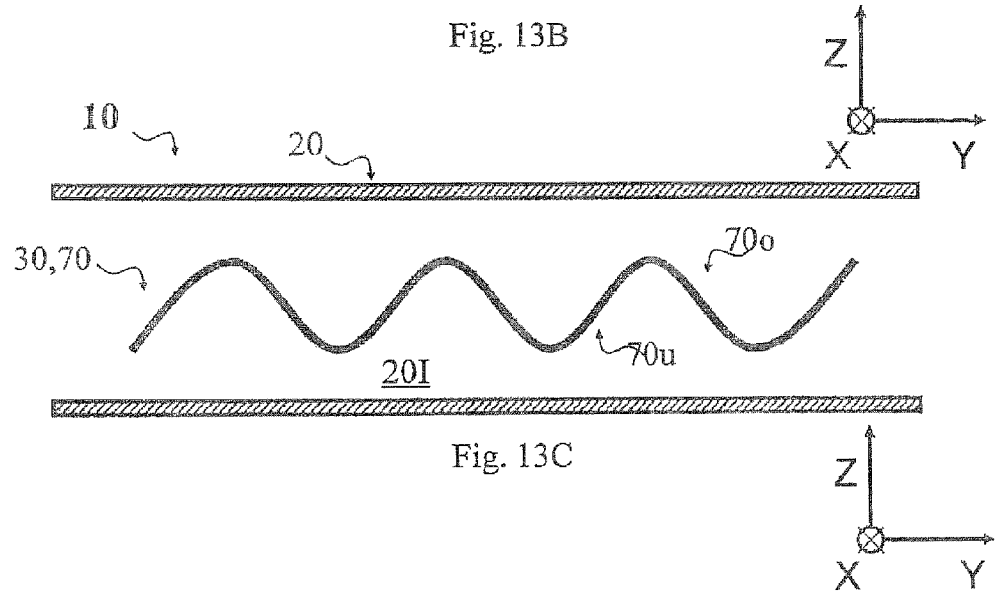

FIGS. 11A to 11C show in a schematic cross-sectional top view different embodiments of the crash protection element 10 according to the invention, wherein several rows of stabilizing/compression elements 30 in hollow body form 40 are provided.

FIG. 11A shows identical hollow body forms 40 for the stabilizing/compression elements 30, extending in parallel in the Y-direction and the Z-direction.

In the arrangement of FIG. 11C, two rows with a plurality of stabilizing/-compression elements 30 extending in parallel in the Y-direction are provided; however, these are mutually offset, i.e., staggered.

In the arrangement of FIG. 11B, the plurality of stabilizing/compression elements 30 is subdivided. In the center region, a single row with a plurality of stabilizing/compression elements 30 is provided. In the outer regions, the stabilizing/compression elements 30 are again arranged in two parallel rows.

FIGS. 13A to 13F show different embodiments of the crash protection element 10 according to the invention using at least one stabilizing/compression element 30 in form of a multi-undulated intermediate wall element 70. The embodiments of FIGS. 13A to 13D are each constructed with a corresponding individual stabilizing/compression element 30 in form of a multi-undulated wall element 70, meaning they have a cross-sectional shape with a sawtooth-shaped pattern, a stepped pattern, a wavelike, preferably sinusoidal pattern, or a pattern with ovals, based on the stepped shape of FIG. 13B.

FIG. 13E shows an embodiment with two stabilizing/compression elements 30, each with a sawtooth shaped, multi-undulated intermediate wall. However, several shapes may be repeated several times, and the undulated intermediate wall elements 70 need not have the same shape.

In addition, the different structural features in the direction Y can also alternate, i.e., a multi-undulated intermediate wall element 70 may be configured with different undulation in certain segments.

Lastly, in the embodiment of FIG. 13F, a multi-undulated intermediate wall element 70 and a plurality of stabilizing/compression elements 30 with hollow body form 40 are combined with each other. Different combinations can here also be envisioned.

Figure 14:
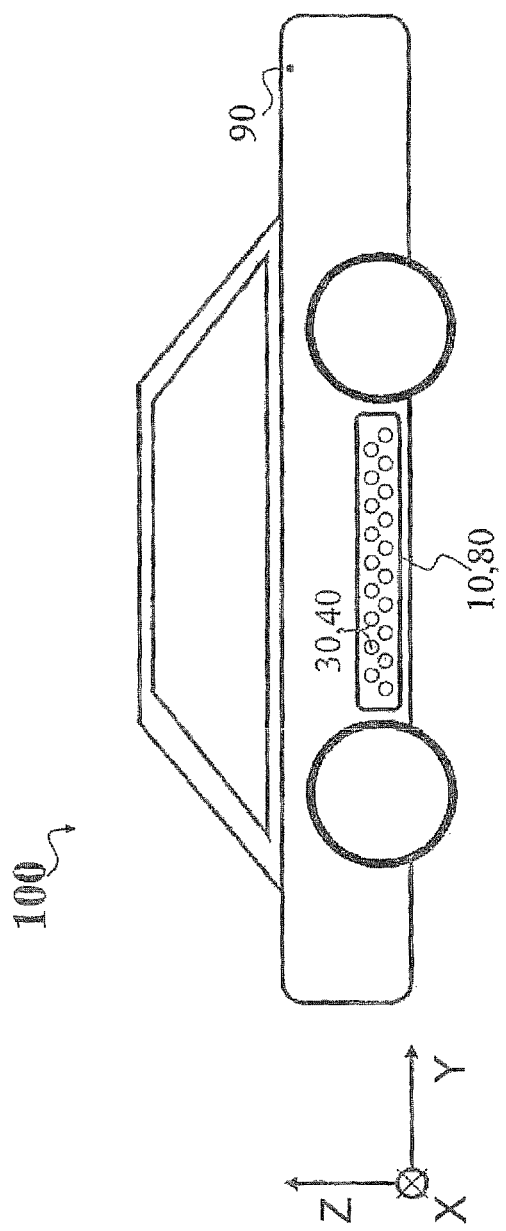
FIG. 14 shows an application of a crash protection element according to the present invention as a rocker panel or in a rocker panel of a motor vehicle.

FIG. 14 finally shows the use of an embodiment of the crash protection element 10 according to the invention in the region of a vehicle 100, namely a passenger vehicle, in its body 90 or as part of the so-called rocker panel 80.

Figure 15:
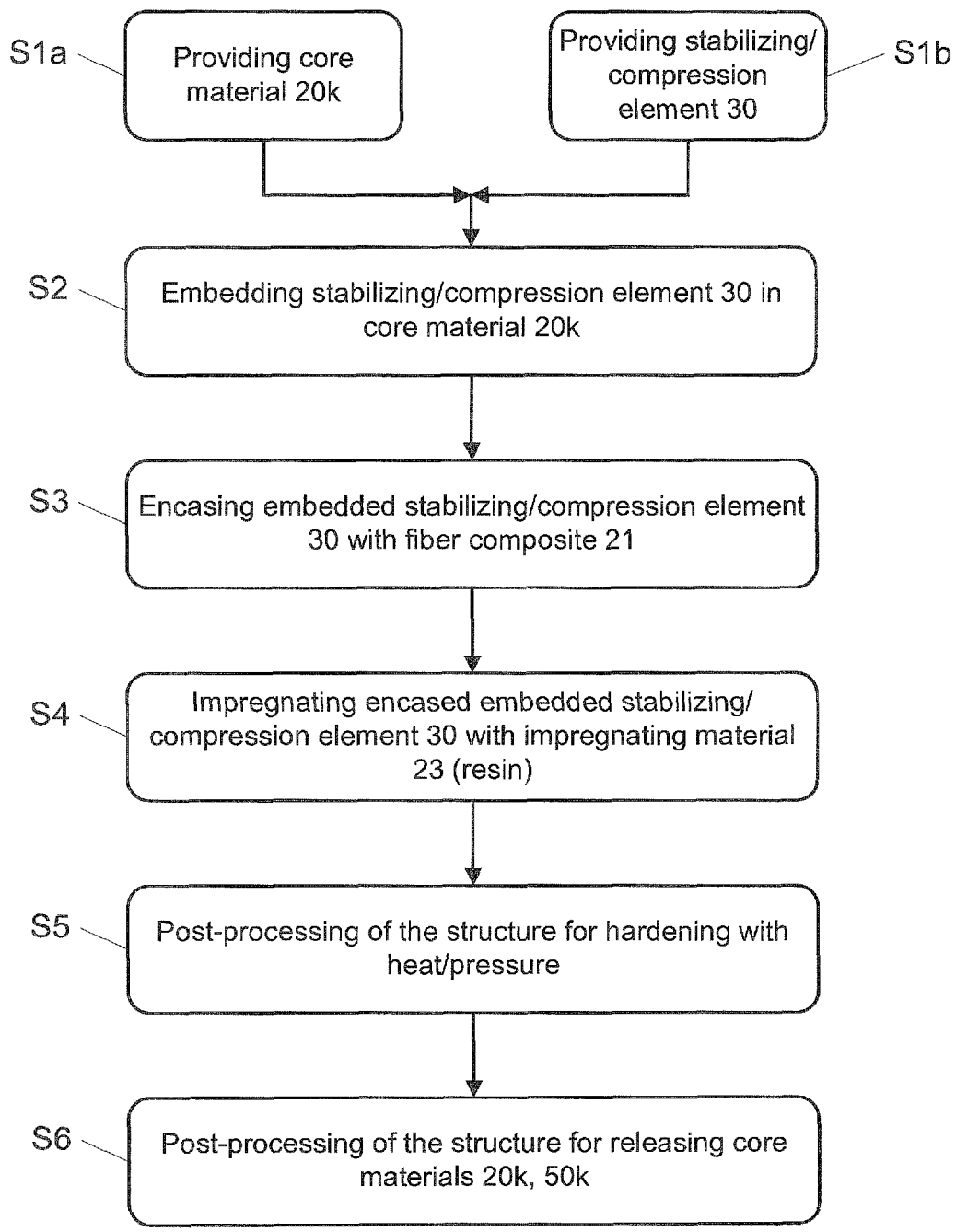
FIG. 15 is a schematic block diagram illustrating schematically a manufacturing process for a crash protection element according to the present invention.

FIG. 15 illustrates an embodiment of the method according to the invention for producing a crash protection element 10 according to the invention.

At steps S1*a* and S1*b*, the core material 20*k* for the hollow body element 20 and the stabilizing/compression elements 30 forming the basis for the crash protection element 10 according to the invention are provided.

At step S2, the one or more stabilizing/compression elements 30 are embedded in the core material 20*k*. This can be done either by forming corresponding openings in the supplied core material 20*k* and by inserting or introducing the one or more stabilizing/compression elements 30 into the openings, or by providing the one or more stabilizing/compression elements 30 and suitably enveloping them with the provided core material 20*k*.

At step S3, the obtained embedded structure with the embedded stabilizing/compression elements 30 is encased with a CFK material 21 for the hollow body element 20 forming the basis for the crash protection element 10 according to the invention.

At step S4, the obtained structure with the encased embedded stabilizing/compression elements 30 is impregnated with an impregnating material 23. This may be a resin or phenol resin, and the like.

At steps S5 and S6, the obtained impregnated structure can be post-processed.

Post-processing may include, on one hand, at step S5, a hardening process through application of heat and/or pressure, whereby the composite material made of fiber material and resin matrix is also finished and/or the stabilizing/compression elements 30 are attached on the inside 20i, 25i of the hollow body element 20 forming the basis for the crash protection element 10 according to the invention, which serve as a jacket 25.

Alternatively or in addition, at step S6, the core material(s) 20k may be released in a temperature step, in order to subsequently form actual hollow body-shaped structures in the interior of the hollow body element 20 forming the basis for the crash protection element 10, and/or in the interior 30l, 40l of the optionally provided hollow body-shaped stabilizing/compression elements 30.

There is no need to execute the steps S4 of impregnating and S5 of hardening and/or joining separately, as for example in a VAP process and the like, where hardening is defined in S5 as the next step. With other processes, for example the RIM process, hardening and/or joining of step S5 is already performed simultaneously with the process of impregnating or infusion of step S4, namely when the employed tool is under pressure and temperature.

FIGS. 16A to 16E show in a schematic cross-sectional top view different intermediate stages during the manufacture of a crash protection element 10 according to the invention.

Figure 16:
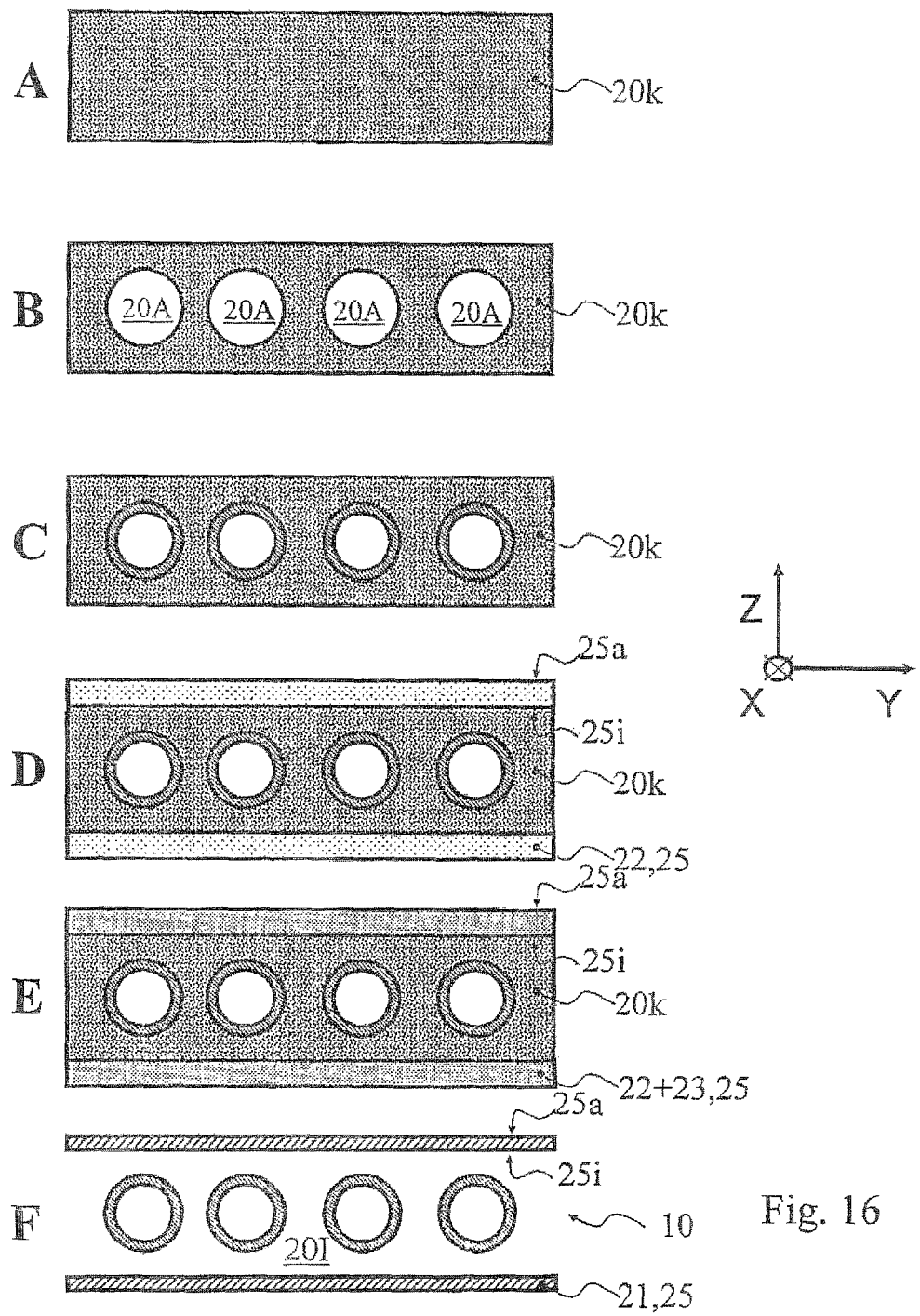
FIGS. 16A-F show schematic cross-sectional top views of different stages during manufacture of a crash protection element of the present invention.

In the intermediate state illustrated in FIG. 16A, a core material 20k for the hollow body element 20 forming the basis for the crash protection element 10 is provided.

In the transition to the intermediate state illustrated in FIG. 16B, openings 20A are introduced into the provided core material 20k, which have a shape corresponding to the shape of the stabilizing/compression elements 30 to be inserted and are configured to receive them.

In the transition to the intermediate state illustrated in FIG. 16C, the stabilizing/compression elements 30 are then inserted or introduced into the created openings 20A.

In the transition to the intermediate state illustrated in FIG. 16D, the obtained structure is then encased with a preform 22 of the CFK material 21 for the hollow body element 20 of the crash protection element 10 according to the invention, for example by wrapping or the like.

Impregnation with an impregnating material 23 takes place in the transition to the intermediate state illustrated in FIG. 16E, and a corresponding post-treatment for embedding the preform 22 of the CFK material 21 in the matrix of the impregnating material 23 and hence for finishing the CFK material 21 and the jacket 25 and for releasing the core region, i.e. the core material 20k from the interior 20l of the hollow body element 20 forming the basis for the crash protection element 10 according to the invention, takes place in the transition to the intermediate state illustrated in FIG. 16F.

The stabilizing/compression elements 30 on the interior side 25i of the jacket can be connected simultaneously with the impregnation, e.g., when impregnation is performed under pressure and/or temperature, for example in a mold tool; however, separate process steps are also feasible and possible, wherein the structure is first impregnated and then post-processed for attaching the stabilizing/compression elements on the interior side 25i of the jacket 25.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A crash protection element for a vehicle body for absorbing and/or dissipating kinetic energy caused by a force impacting the vehicle body, comprising:
    a hollow body element comprising a fiber composite and having a front wall element facing a suspected impact direction and a rear wall element facing away from the suspected impact direction, said front and rear walls of the hollow body element bounding an interior space, and
    a stabilizing/compression element arranged in the interior space of the hollow body element and attached on interior sides of the front and rear wall elements of the hollow body element,
    wherein the stabilizing/compression element is constructed in at least one of two ways, a first way in which the at least one stabilizing/compression element is configured in form of a hollow body, a second way in which the stabilizing/compression element is configured in form of a multi-undulated intermediate wall element.

2. The crash protection element of claim 1, wherein the hollow body of the stabilizing/compression element has a constant diameter or cross-section between a side facing away from the suspected impact direction and a side facing the suspected impact direction.

3. The crash protection element of claim 1, wherein the hollow body is shaped as a vertical or oblique cylinder with a base shaped as a circle, an ellipse, or a polygon.

4. The crash protection element of claim 1, wherein the hollow body is formed with or from at least one fiber composite.

5. The crash protection element of claim 1, further comprising a plurality of said stabilizing/compression element in the form of hollow bodies arranged in one or more rows which extend perpendicular to the suspected impact direction or in a longitudinal direction of the hollow body element.

6. The crash protection element of claim 1, wherein exterior sides of front and rear wall elements forming end faces of the hollow body are attached to corresponding interior sides of the front and rear wall elements of the hollow body element.

7. The crash protection element of claim 1, wherein the multi-undulated intermediate wall element defines an undulation direction which extends perpendicular to the suspected impact direction or to a longitudinal direction of the hollow body element.

8. The crash protection element of claim 1, wherein the multi-undulated intermediate wall element has a front edge and a rear edge, wherein the front and rear edges are attached to the interior sides of the front and rear wall element of the hollow body element.

9. The crash protection element of claim 1, wherein the multi-undulated intermediate wall element is formed with or from at least one fiber composite.

10. The crash protection element of claim 1, wherein the fiber composite comprises at least one material selected from the group consisting of CFK material, glass material, aramide material, natural fiber material, and basalt material.

* * * * *

UNITED STATES PATENT AND TRADEMARK OFFICE
CERTIFICATE OF CORRECTION

PATENT NO. : 8,608,232 B2
APPLICATION NO. : 13/075562
DATED : December 17, 2013
INVENTOR(S) : Rudolf Engertsberger and Roland Zöpfl Page 1 of 1

It is certified that error appears in the above-identified patent and that said Letters Patent is hereby corrected as shown below:

In the Specification:

Column 5, line 39; column 10, line 28 and 40, as well as column 15, line 17:
Please replace "RIM process" with --RTM process--.

Column 7, line 52:
Please replace "in from" with --in form--.

Column 10, line 42:
Please replace "shown a in a" with --shown in a--.

Signed and Sealed this
Twenty-fifth Day of March, 2014

Michelle K. Lee
*Deputy Director of the United States Patent and Trademark Office*